US011072561B2

(12) United States Patent
Rolland et al.

(10) Patent No.: US 11,072,561 B2
(45) Date of Patent: Jul. 27, 2021

(54) FATTY ALCOHOL AQUEOUS SUSPENSION-BASED ANTI-FILMING SURFACE ADMIXTURE

(71) Applicant: SIKA TECHNOLOGY AG, Baar (CH)

(72) Inventors: Jérôme Rolland, Charleval (FR); Oliver Herr, Neuf-Marché (FR); Joachim Monge, Paris (FR); Justine Nigaud, Préaux (FR); Jean-Jacques Ouallet, Gournay-en-Bray (FR)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 15/573,003

(22) PCT Filed: May 25, 2016

(86) PCT No.: PCT/EP2016/061855
§ 371 (c)(1),
(2) Date: Nov. 9, 2017

(87) PCT Pub. No.: WO2016/189062
PCT Pub. Date: Dec. 1, 2016

(65) Prior Publication Data
US 2018/0141865 A1 May 24, 2018

(30) Foreign Application Priority Data
May 27, 2015 (EP) ..................................... 15305801

(51) Int. Cl.
*C04B 24/12* (2006.01)
*C04B 24/08* (2006.01)
(Continued)

(52) U.S. Cl.
CPC .......... *C04B 24/128* (2013.01); *C04B 24/026* (2013.01); *C04B 24/08* (2013.01);
(Continued)

(58) Field of Classification Search
CPC ..... C04B 24/128; C04B 24/026; C04B 24/08; C04B 24/122; C04B 28/04; C04B 28/14;
(Continued)

(56) References Cited

U.S. PATENT DOCUMENTS

| 1,855,271 | A | * | 4/1932 | Seaton | .................... C04B 24/08 |
| | | | | | 106/663 |
| 3,486,916 | A | | 12/1969 | Cordon | |

(Continued)

FOREIGN PATENT DOCUMENTS

| FR | FF2928915 | * | 3/2008 |
| FR | 2928915 A1 | | 9/2009 |

(Continued)

OTHER PUBLICATIONS

Weissermel et al., "Chapter 7. Oxidation Products of Ethylene". Industrial Organic Chemistry. Wiley-VCH. pp. 159-161, 2003.
(Continued)

*Primary Examiner* — Patricia L. Hailey
(74) *Attorney, Agent, or Firm* — Oliff PLC (57) ABSTRACT

A composition includes: an ethoxylated fatty alcohol having from 8 to 22 carbon atoms and having an ethoxylation level of from 1 to 10 moles of ethylene oxide per mole of fatty alcohol, —an alkanolamine or a morpholine, or its derivatives or mix of them, and a fatty acid. A hydraulic binder includes the composition. A process prevents the formation of a surface film at the surface of hydraulic binders, wherein the composition is added to the dry hydraulic binder. A process for preparing the composition, includes: melting the ethoxylated fatty alcohol and heating it at a temperature above its melting point, adding water to the melted ethoxylated fatty alcohol and mixing, adding fatty acid to the
(Continued)

mixture and mixing, adding alkanolamine or morpholine, or its derivative or mix of them to the mixture obtained and mixing, and adding water.

20 Claims, 5 Drawing Sheets (51) Int. Cl.
    *C04B 24/02* (2006.01)
    *C04B 40/00* (2006.01)
    *C04B 28/04* (2006.01)
    *C04B 28/14* (2006.01)
    *C04B 28/16* (2006.01)
    *C04B 111/60* (2006.01)
    *C04B 111/21* (2006.01)

(52) U.S. Cl.
    CPC ............ *C04B 24/122* (2013.01); *C04B 28/04* (2013.01); *C04B 28/14* (2013.01); *C04B 28/145* (2013.01); *C04B 28/16* (2013.01); *C04B 40/0039* (2013.01); *C04B 40/0046* (2013.01); *C04B 2111/21* (2013.01); *C04B 2111/60* (2013.01)

(58) Field of Classification Search
    CPC ... C04B 28/145; C04B 28/16; C04B 40/0039; C04B 40/0046; C04B 2111/21; C04B 2111/60
    USPC ......... 106/620, 664, 666, 713, 739; 510/405
    See application file for complete search history.

(56) References Cited

U.S. PATENT DOCUMENTS

| | | | | |
|---|---|---|---|---|
| 4,495,319 A | * | 1/1985 | Sackis | C04B 40/04 106/271 |
| 5,695,551 A | * | 12/1997 | Buckingham | C04B 41/009 106/2 |
| 6,809,148 B1 | * | 10/2004 | Koppers | C04B 24/2641 524/2 |
| 6,849,118 B2 | * | 2/2005 | Kerkar | C04B 24/02 106/696 |
| 8,449,626 B2 | * | 5/2013 | De Buzzaccarini | C11D 3/3953 8/137 |
| 10,781,406 B2 | * | 9/2020 | Gizaw | C11D 3/3769 |
| 2006/0166898 A1 | * | 7/2006 | Chen | A01N 47/22 514/22 |
| 2008/0017078 A1 | * | 1/2008 | Bichler | C04B 28/14 106/717 |
| 2012/0186495 A1 | * | 7/2012 | Mateo | C04B 24/026 106/802 |
| 2015/0027348 A1 | | 1/2015 | Mateo et al. | |
| 2017/0037170 A1 | * | 2/2017 | Gonzalez | C08F 220/18 |
| 2017/0341987 A1 | * | 11/2017 | Von Per Schulenburg | C04B 38/10 |

FOREIGN PATENT DOCUMENTS

| | | | |
|---|---|---|---|
| FR | 2948930 A1 | | 2/2011 |
| GB | 2027753 | * | 2/1980 |
| GB | 2027753 A | | 2/1980 |
| WO | 95/04008 A1 | | 2/1995 |
| WO | 2013/124350 A1 | | 8/2013 |

OTHER PUBLICATIONS

Jul. 28, 2016 Search Report issued in International Patent Application No. PCT/EP2016/061855.
Jul. 28, 2016 Written Opinion issued in International Patent Application No. PCT/EP2016/061855.
Sep. 12, 2018 Office Action issued in European Patent Application No. 16725131.3.
Mar. 4, 2019 Office Action issued in European Application No. 16 725 131.3.

* cited by examiner

FATTY ALCOHOL AQUEOUS SUSPENSION-BASED ANTI-FILMING SURFACE ADMIXTURE

TECHNICAL FIELD

The present invention is directed to a composition comprising an ethoxylated fatty alcohol having from 8 to 22 carbon atoms and having an ethoxylation level of from 1 to 10 moles of ethylene oxide per mole of fatty alcohol, its uses and method of preparation.

The invention finds applications in the industry, particularly in construction industry and chemical industry.

In the description below, the references into brackets ([ ]) refer to the list presented at the end of the description.

BACKGROUND OF THE INVENTION

It is customary to cast mortar screeds onto the ground in order to flatten, level or surface a support and/or coat a heating floor in order to then receive upper layers (all types of support: tiling, flexible flooring, floating or laminated flooring, etc.).

After casting, setting and drying at the surface of screeds, the appearance of a surface film is frequently observed with a thickness of a few hundredths of millimeters formed with particles based on calcium hydrates moving up to the surface. The fine film has folds and inesthetical flakings and considerably reduces the surface adherence capacities of finishing materials intended to subsequently cover the screeds, such as plaster, ceramics, paints, various coatings or other materials.

This type of film is also observed at the surface of other hydraulic compositions such as self-compacting concrete (SCC), a concrete capable of setting itself into place in even complex and constricted forms under the sole effect of gravity.

In order to obtain sufficient adherence of the finishing materials to the surface, it proves to be necessary to brush, scrape or sand down the surface before beginning with the finishing work in order to remove the film therefrom. This work is long and expensive.

The use of an admixture comprising an anti-shrinkage agent of the alkylene oxide type and a fatty alcohol is known from U.S. Pat. No. 6,849,118 ([1])in order to prevent the formation of surface dusts caused by the anti-shrinkage agent.

A method of making a hydraulic binder with improved resistance to formation of a surface film, comprising adding a composition comprising at least one fatty alcohol and at least one oil as an anti-filming surface admixture to the hydraulic binder is described in WO 2013124350 ([2]). However, this composition could possibly not be perfectly miscible in screeds and concrete, and could possibly become "out of phase".

Moreover the use of $C_{14}$-$C_{22}$ fatty alcohols is known from WO 95/04008 ([3]) for inhibiting efflorescence in cement compositions, preferably as an emulsion. The efflorescence however differs from the described particle film in that it results from a carbonatation reaction of calcium salts at the surface of cement compositions.

The use of a fatty alcohol emulsion is also known from U.S. Pat. No. 3,486,916 ([4]), for limiting the evaporation of water on exterior surfaces.

Furthermore, the use of an admixture in powder form, comprising a fatty alcohol and an anti-caking agent is known from FR2948930 ([5]), for reducing the formation of films on horizontal surfaces. Like all finely divided organic compositions, this type of composition may be flammable and/or explosive, since it comprises fatty compounds, in particular fatty alcohols in finely divided powder form. It is therefore necessary to take precautions in the storage and handling of the product (for example, grounding of installations).

An adjuvant as an anti-filming surface admixture to the hydraulic binder composition of fatty alcohol in the form of a powder is described in FR2928915 ([6]).

Because of their low melting point and of their hydrophobicity, fatty alcohols are however difficult to disperse and rapidly agglomerate under heat or even during storage under their own weight, which makes their use difficult.

As a consequence, the handling and dosage of a powder comprising fatty alcohols, when preparing hydraulic binders, is difficult, especially since the fatty alcohols tends to coalesce at temperatures above 30°/40° C.

Finally, some fatty alcohols, as stearyl alcohol, are solid at ambient temperature, and their use as liquid adjuvant is therefore difficult.

The objective of this invention is therefore to propose an admixture, making it possible to reduce the formation of films on horizontal surfaces of hydraulic compositions not having the disadvantages described above. Another objective of the present invention is to provide such an admixture easy to use and stable at temperatures of 5 to 40° C., as well as over time (stable in storage).

DESCRIPTION OF THE INVENTION

According to the invention, this problem is solved by the composition of the invention, which contains a fatty alcohol.

The Applicant has surprisingly prepared an aqueous suspension containing a fatty alcohol, said suspension being fluid, and does not crystallize, at room temperature or at lower temperatures.

Surprisingly, the suspension of the invention may have a level of emulsifier which is lower than the levels of emulsifiers of classical suspensions.

Furthermore, the composition has the surprising advantage to be stable when store at room temperature during 6 months, or even longer.

Moreover, the composition does not become out of phase when stored at high or at low temperature.

For all these reasons, and also because the composition of the invention is fluid and pumpable, it may be used as an adjuvant, especially for concrete, likely to be used in concrete mixing plant and dosed with classical dosage tools to be added in concrete at the job site.

A first object of the invention is so directed to a composition comprising at least:
  an ethoxylated fatty alcohol having from 8 to 22 carbon atoms, especially having form 12 to 18 carbon atoms, and having an ethoxylation level of from 1 to 10 moles, especially 1-3 moles, of ethylene oxide per mole of fatty alcohol,
  an alkanolamine, in particular a trialkanolamine, or a morpholine, or its derivatives or mix of them, and
  a fatty acid having from 12 to 22 carbon atoms, especially 12 to 18 carbon atoms, or a mixture thereof.

«Fatty alcohol» refers herein to any long-chain alcohols comprising of from 8 to 22 carbon atoms, usually having an even number of carbon atoms and a single alcohol group (—OH) attached to the terminal carbon, that may be saturated or unsaturated, linear or branched. It can be derived from natural fats and oils, for example from waxes, that may be produced bacteria, plants and animals. Alternatively, it can be prepared from petrochemical sources, for example using the Ziegler process. Examples of such compounds are myristic alcohol (C14), cetyl alcohol (C16), lauryl alcohol (C12) and stearyl alcohol (C18). These fatty alcohols are solids (waxes) at ambient temperature (approximately 20° C.), and are readily available in commercial quantities.

The composition of the invention may comprise more than one fatty alcohol, i.e. may comprise a mixture of different fatty alcohols.

In particular, the fatty alcohol is stearyl alcohol and/or cetyl alcohol.

Preferably, the fatty alcohol is stearyl alcohol. More preferably, the fatty alcohol is a stearyl alcohol having 2 moles of ethylene oxide per mole of fatty alcohol, also named alkyl polyglycol ether C18.

"Alkanolamine" refers herein to any chemical compound that contains both hydroxyl (—OH) and amino (—NH2, —NHR, and —NR2) functional groups on an alkane backbone. It can be prepared by any method known by the person skilled in the art, for example by reaction of an alkylene oxide and either an amine or ammonia at elevated temperature. Examples of such compounds are monoethanolamines, N-methyldiethanolamine, triisopropanolamine, triethanolamine. monoethanolamine, N-Methyl ethanolamine and triethanolamine are structurally close as they contain an amine group substituted with one, two or three ethanol group(s) and one methyl regarding N-Methyl diethanolamine. The structure of triisopropanolamine is close to the one of triethanolamine, as the ethanol groups are substituted by propanol, which may explain similar efficacy. In particlar, alkanolamine may be triethanolamine, which refers to 2,2',2-nitrilotriéthanol, the molecular formula of which is $C_6H_{15}NO_3$. Triethanolamine may be produced from the reaction of ethylene oxide with aqueous ammonia. It is readily available in commercial quantities. Without being linked by any mechanism of action, it is supposed that alkanolamine, especially triethanolamine, may have the function of emulsifying and/or surfactant in the composition of the invention.

Preferably, the alkanolamine is a trialkanolamine. Such alkanolamines contain an amine group substituted with three alkanol groups. Especially preferred, the alkanolamine comprises 6-12 carbon atoms, more preferably, 6-9 carbon atoms. In particular, the alkanolamine comprises triisopropanolamine and/or triethanolamine.

"Morpholine" refers herein to any organic chemical compound having the chemical formula O(CH2CH2)2NH, which is an heterocycle featuring both amine and ether functional groups. It also refers to its derivatives. Such derivatives may contain an ether group and an amine group, which is a structure close to the one of an alkanolamine. The derivatives may be for examples morpholinoethanol, which is a morpholine containing in addition an ethanol group, morpholinoisopropanol, which is a morpholine containing in addition a propanol group, those derivatives having a close structure, which may explain an efficacy close to the one of triethanolamine. It may be prepared by any method known by the person skilled in the art, for example by the dehydration of diethanolamine with sulfuric acid (Weissermel et al. (2003). "Chap. 7. Oxidation Products of Ethylene". Industrial Organic Chemistry. Wiley-VCH. pp. 159-161 ([7])).

"Mix of them" refers herein to any mixture containing one or more alkanolamine(s) and/or morpholine and/or one or more derivative(s) of morpholine.

"Fatty acid" refers herein to any long-chain acids comprising of from 12 to 22 carbon atoms, in particular a carboxylic acid with a long aliphatic chain comprising of from 12 to 22 carbon atoms, which can be either saturated or unsaturated. It may be prepared by any method known by the person skilled in the art, for example it can be derived from triglycerides or phospholipids. It may be of from animal or vegetal source. Examples of unsaturated fatty acids may be myristoleic acid (C14), palmitoleic acid (C16), sapienic acid (C16), oleic acid (C18), elaidic acid (C18), vaccenic acid (C18), linoleic acid (C18), linoelaidic acid (C18), α-Linolenic acid (C18), arachidonic acid (C20), eicosapentaenoic acid (C20), erucic acid (C22), docosahexaenoic acid (C22). Examples of saturated fatty acids may be caprylic acid (C8), capric acid (C10), lauric acid (C12), myristic acid (C14), palmitic acid (C16), stearic acid (C18), arachidic acid (C20), behenic acid (C22).

In particular, the fatty acid is lauric acid (C12), palmitic acid (C16) and/or stearic acid (C18).

Preferably, the fatty acid is stearic acid, which refers to a saturated fatty acid with an 18-carbon chain and has the IUPAC name octadecanoic acid. It is a waxy solid and its chemical formula is $C_{17}H_{35}CO_2H$. Stearic acid is obtained from fats and oils by the saponification of the triglycerides using hot water (above 200° C.), and the resulting mixture is then distilled. It is readily available in commercial quantities. Without being linked by any mechanism of action, it is supposed that stearic acid may have the function of surfactant in the composition of the invention.

Compositions comprising the following combinations have been proven to be especially preferred:
i. C16-alcohol ethoxylate, C16 fatty acid and morpholine;
ii. C16-alcohol ethoxylate, C16 fatty acid and trialkanolamine;
iii. C18-alcohol ethoxylate, C18 fatty acid and trialkanolamine.

Even more preferred are compositions comprising:
i. cetyl alcohol ethoxylate, palmic acid and morpholine;
ii. cetyl alcohol ethoxylate, palmic acid and triisopropanolamine;
iii. stearyl alcohol ethoxylate, stearic acid, triethanolamine.

In some embodiment, it is suitable for the composition according to the invention to be troubled, hazy and/or milky, possibly white, and homogeneous, i.e. for the composition not to contain compounds that are non-dissolved and/or non-dispersed at room temperature (i.e. about 25° C.), so as to provide a product that is stable in storage and handling.

Thus, the composition of the invention may comprise:
from 2 to 30% by weight of said ethoxylated fatty alcohol, for example of 6%, or of 7%, or more particularly of about 7.5%,
from 0.007% to 3% by weight of said alkanolamine or morpholine or its derivatives or mix of them, for example triethanolamine, and
from 0.013% to 6% by weight of said fatty acid, for example stearic acid,
with respect to the weight of the composition.

Such proportions may be measured by any method available to the man skilled in the art, for example a scale).

Advantageously, the composition of the invention is in the form of a liquid at room temperature, corresponding to the melting point of the composition below 30° C., and preferably below 20° C., much specifically at approximately 15° C. to 10° C. The density of the composition of the invention may be comprised of from 0.7 to 1.0, for example of about 0.9. As the viscosity of the composition of the invention may increase in cold weather, it may be advantageous to use it at a temperature above 10° C. It may also be advised to store it in a frost-free place, and to comply with the recommendations of storage generally admitted for liquid form adjuvants.

More advantageously, the composition of the invention is an aqueous suspension. In this case, the composition comprises water, for example in a quantity sufficient to reach 100% by weight of the composition in view of the proportion of the other components of the composition. In the suspension of the invention, the fatty alcohol is dispersed in water in the form of solid particles, and stabilized thanks to emulsifiers.

Without intending to be linked by the hypothesis, it is a possible explanation that the fatty acid and the fatty alcohol interact via intermolecular linkages, while the alkanolamine allows the solubilization of the whole.

Advantageously, the composition of the invention may be constituted by the components mentioned above, i.e. containing only those components. However, it may be useful in some cases to add other agents, in particular anti-foaming agents, deflocculant agent, Rheological agents, plasticizers, in particular superplasticizers, setting modifiers, coloring agents, biocides, calcium neutralizing agents, for example calcium disodium ethylenediaminetetraacetic or acid disodium ethylenediaminetetraacetic acid, and other conventional emulsifying agents.

In a particular embodiment, the composition of the invention has a dry matter content of between 2% to 30% by weight with respect to the weight of the composition. Such a proportion may be measured by any method available to the man skilled in the art, for example by a halogen desiccator.

The preparation of the composition of the invention can be performed with simple means. According to another aspect, the invention therefore relates to a method for preparing the composition of the invention, which comprises the steps of:

a) melting the ethoxylated fatty alcohol and heating it at a temperature above its melting point, b) adding the melted ethoxylated fatty alcohol obtained from step a) to water, and mixing, c) adding fatty acid to the mixture obtained from step b), and mixing, d) adding alkanolamine to the mixture obtained from step c), and mixing, e) adding water, f) thereby obtaining a composition of the invention.

Regarding step a), the temperature may be comprised of from 40° C. to 70° C. For example, when the fatty alcohol is a stearyl alcohol having 2 moles of ethylene oxide per mole of fatty alcohol, the temperature may be about 65° C.

After step a) and before step b), it is possible to heat a container at the same temperature as the one of step a) and to add water into the heated container before adding the melted fatty alcohol to the water into the container. It is preferable to use at this stage of from ⅓ to ⅔ of the total of water added during the method for preparing the composition. Advantageously, about half of the total water added is used at this stage. Advantageously, the water is heated at the same temperature as the fatty alcohol before adding the fatty alcohol in step b).

Regarding step b), mixing may be realized at a speed comprised of from 100 and 1000 rpm, preferably from 250 and 500 rpm.

Regarding step c), stearic acid is preferably added into the container to fatty alcohol and water in such a manner to facilitate its dispersion. In an embodiment of the invention, a salt of ethylenediaminetetraacetic acid is also added at this stage of the method. The mixing may be realized at a speed comprised of from 100 and 1000 rpm, preferably from 250 and 500 rpm.

Regarding step d), it may be advantageous to maintain the temperature of the mixture under about 70° C. The mixing is advantageously realized at low speed.

After step d) and before step e), it may be advantageous to add to the mixture into the container an anti-foaming agent. The mixing is at this stage realized at low speed.

Regarding step e), the level of water added into the container containing the mixture is advantageously the rest of the water that has previously been added during step b). It may advantageously represents half of the total water added during the entire method of preparation. Advantageously, the water added at this step of the method is cold water, or temperature room water.

After step e), it may be advantageous to add to the mixture a biocide.

The mixing is realized at low speed and then the composition is obtained. Advantageously, the composition is immediately placed into a container maintained at room temperature.

Another object of the invention relates to the use of a composition of the invention as defined above, as an adjuvant for a hydraulic binder.

In other words, the composition may be considered as an adjuvant for hydraulic binders, that may be added into the preparation of a hydraulic binder at the site of preparation and pouring of the hydraulic binder.

Another object of the invention is the use of a composition of the invention as defined above, for preventing the formation of a surface film at the surface of a hydraulic binder.

"Hydraulic binder" refers herein to any compound having the property of being hydrated in the presence of water and the hydration of which makes it possible to obtain a solid having mechanical characteristics. The hydraulic binder can be a cement according to standard EN 197-1 and in particular a Portland cement, and in particular a CEM I, CEM II, CEM III, CEM IV or CEM V cement according to the Cement standard NF EN 197-1. The cement can therefore in particular include mineral additions. Such mineral additions may refer to slag (as defined in Cement standard NF EN 197-1, paragraph 5.2.2), steel slag, pozzolanic materials (as defined in the Cement standard NF EN 197-1, paragraph 5.2.3), fly ash (as defined in Cement standard NF EN 197-1, paragraph 5.2.4), calcined schist (as defined in Cement standard NF EN 197-1, paragraph 5.2.5), limestone (as defined in Cement standard NF EN 197-1, paragraph 5.2.6) or silica fume (as defined in Cement standard NF EN 197-1, paragraph 5.2.7), or mixtures thereof. The term "hydraulic binder" also encompasses calcium salt, that may be anhydrous or hydrated calcium sulfates that make it possible to produce calcium sulfate-based screeds.

The term "calcium sulfate-based screed" refers to compositions in which the calcium sulfate having hydraulic properties represents at least 85% by weight of the total hydraulic binder or, if admixtures are used, at least 50% and less than 85%. The calcium sulfate can be hemihydrate, alpha or beta, or anhydrite, for example anhydrite II or III. The materials for screeds generally satisfy the conditions provided in standards EN 13813 and 13454-1 relating to mortars for screeds and binders (hydraulic) and calcium sulfate for screeds.

The hydraulic binder may be used for the realization of, or may be, a fluid concrete, referring to any mixture of hydraulic binders with aggregate, sand, water and optionally additives, and optionally mineral additions, including mortar, and more generally to any compound as defined in standard NF EN 934-1, or a self-compacting screeds (also referred as "self-leveling screeds").

Preferably, the hydraulic binder may be used to realize horizontal supports, for example for grounds. In this purpose, the composition of the invention is particularly advantageous as an adjuvant for anhydrite screeds for grounds, because it allows avoiding the apparition of the surface film when the screed is drying.

Another object of the invention relates to a hydraulic binder, comprising a composition of the invention as defined above.

The hydraulic binder may comprise of from 0.1 to 5% of the composition of the invention by weight with respect to the weight of hydraulic binder, for example of from 0.5 to 4%, or from 1 to 3%. Such a proportion of the composition in the hydraulic binder may be measured by any method available to the man skilled in the art, for example scale for additions. Such amount of from 0.1 to 5% of the composition of the invention by weight with respect to the weight of hydraulic binder is particularly advantageous over the state of the art, because this particularly low level of admixture of the invention allows obtaining the technical effect.

Another object of the invention is a process for preventing the formation of a surface film at the surface of hydraulic binders, wherein the composition of the invention is added to the dry hydraulic binder.

The admixture of the invention may be a mass adjuvant. It is therefore advantageously dispersed homogeneously throughout the mass of the hydraulic binder, before, during or after mixing. The composition of the invention may be added to the dry hydraulic binder, or to the sand or aggregate before mixing or during mixing, and preferably the composition is added to the mixing water. Alternatively, the composition may be added to the dry hydraulic binder before the water for mixing.

The following examples are given for illustrative purposes only and are not meant to be a limitation on the claims appended hereto. All parts and percentages are by weight otherwise stated.

EXAMPLES

Example 1

Method of Preparation of an Anhydrite Screed without Anti-Filming Surface Admixture The method of preparation of an anhydrite screed without surface film (i.e. classical screed), the composition of which is disclosed in Table 1, is realized by implementing, in a mortar mixer compliant with the current NF EN 196-1 standard, the following steps:

introducing water and deflocculant agent in a mortar bowl;
adding anhydrous sulphate;
blending at low speed during 1 minute;
adding sand;
blending at low speed during 2 minute;
scraping of the bowl;
blending at low speed during 8 minute;
stopping the blender;
recovery during 20 minutes;
blending during 30 seconds at low speed;
implementing in a metallic bowl of dimensions 4×16×16 cm;
cover the surface of the bowl with a cover;
storage during 4 days at 20° C. and 50% of relative humidity;
control of the surface aspect.

The composition of the anhydrous sulphate-based screed, without anti-filming surface admixture, is given in Table 1.

TABLE 1

| Ingredient | Dosage |
| --- | --- |
| Anhydrous sulphate | 620 Kg/m3 |
| Bernieres dry sand 0/4 mm | 1250 Kg/m3 |
| Deflocculant Sika ® Viscocrete ® Tempo 11 | 1.1%* |
| Total water | 280 L/m3 |

*expressed compared to the level of anhydrous sulphate.

Figure 1:
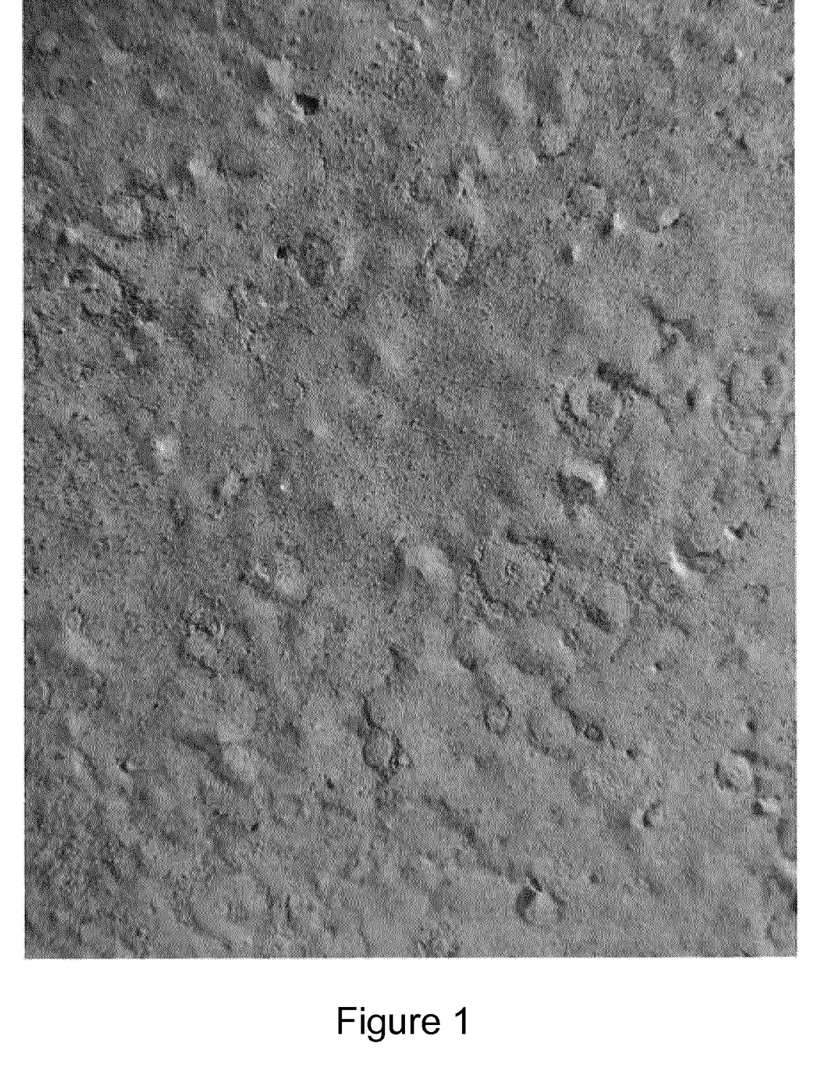
FIG. 1 represents a picture of a classical screed, i.e. that has been realized without the admixture object of the invention.

A picture of surface state of the anhydrous screed without surface film, i.e. prepared without anti-filming surface admixture, is showed by FIG. 1.

Example 2

Method of Preparation of an Anhydrite Screed with Anti-Filming Surface Admixture The method of preparation of an anhydrite screed with anti-film surface admixture, the composition of which is disclosed in Table 2, is realized by implementing, in a mortar mixer compliant with the current NF EN 196-1 standard, the following steps:

introducing water, the anti-film surface admixture and deflocculant agent in a mortar bowl;
adding anhydrous sulphate;
blending at low speed during 1 minute;
adding sand;
blending at low speed during 2 minutes;
scraping of the bowl;
blending at low speed during 8 minutes;
stopping the blender;
recovery during 20 minutes;
blending during 30 seconds at low speed;
implementing in a metallic bowl of dimensions 4×16×16 cm;
cover the surface of the bowl with a cover;
storage during 4 days at 20° C. and 50% of relative humidity;
control of the surface aspect.

The composition of the anhydrous sulphate-based screed, with anti-filming surface admixture, is given in Table 2.

TABLE 2

| Ingredient | Dosage |
| --- | --- |
| Anhydrous sulphate | 620 Kg/m3 |
| Bernieres dry sand 0/4 mm | 1250 Kg/m3 |
| Anti-surface film admixture | 0.25%* |
| Deflocculant Sika ® Viscocrete ® Tempo 11 | 1.1%* |
| Total water | 280 L/m3 |

*expressed compared to the level of anhydrous sulphate.

Figure 2:
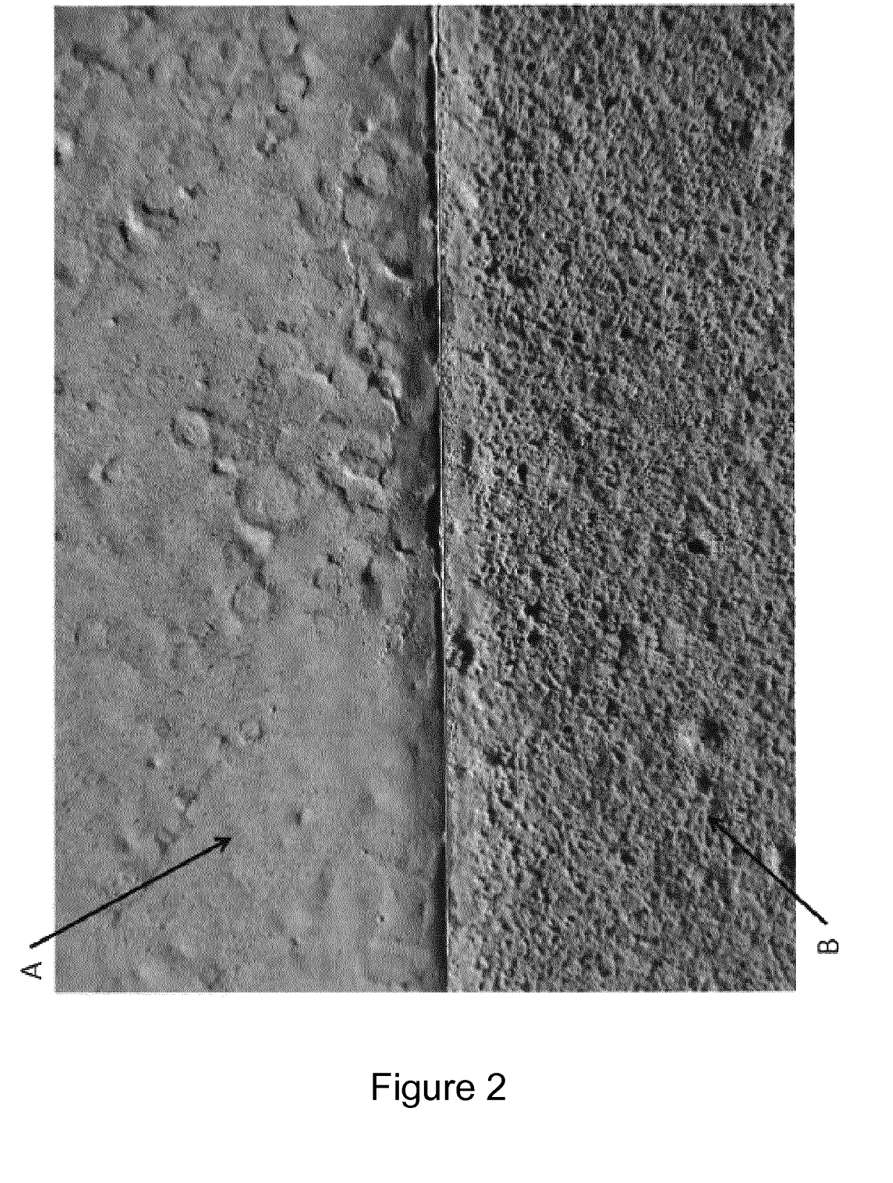
FIG. 2 represents 2 pictures of (A) a classical screed, i.e. that has been realized without the admixture object of the invention, and (B) a screed realized with the admixture object of the invention.
Figure 3:
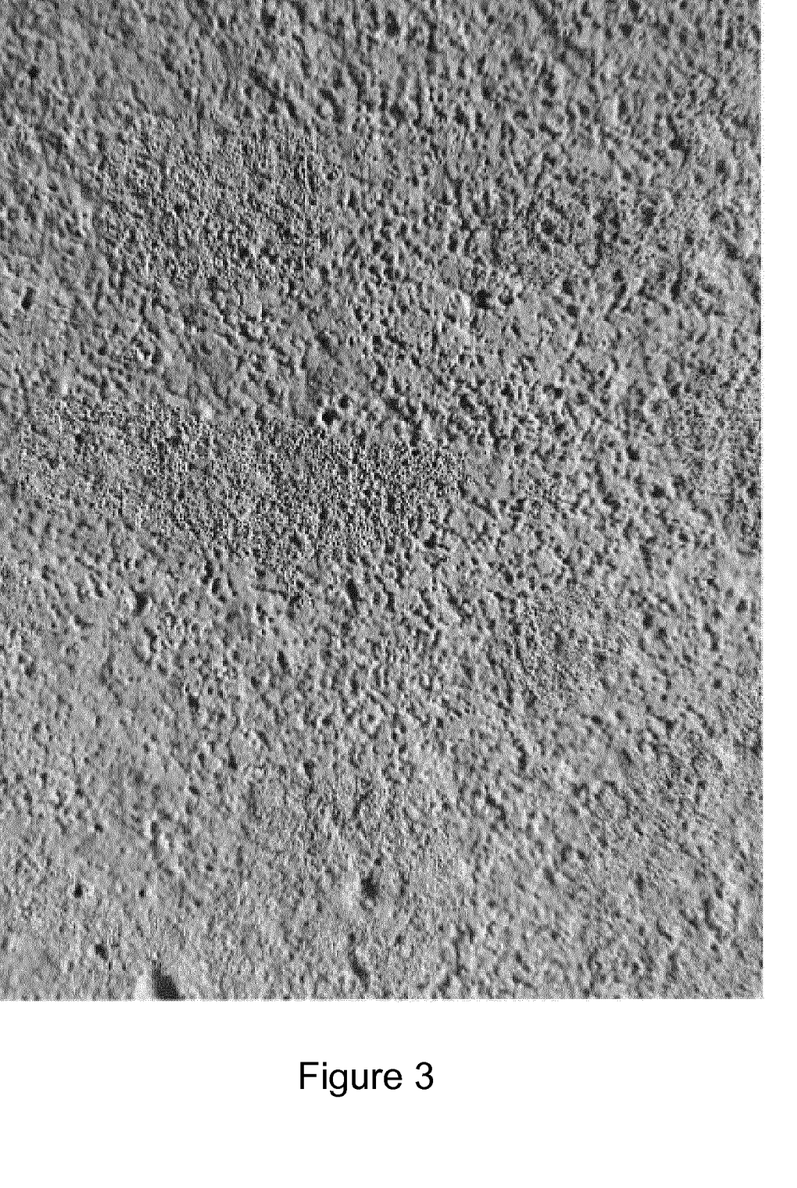
FIG. 3 represents a picture of a screed realized with the admixture object of the invention.

A picture of surface state of the anhydrous screed with anti-filming surface admixture, is showed by FIG. 2.

A picture of surface state of the anhydrous screed with anti-filming surface admixture, is showed by FIG. 2B, and a picture of surface state of the anhydrous screed without surface film, i.e. prepared without anti-filming surface admixture, is showed by FIG. 2A.

Example 3

Comparison of stability of different formula of admixtures

Different formula of admixture have been tested. The stability of these different formula are described in Table 3 below.

TABLE 3

| Stearyl alcohol ethoxylated 2 type Eumulgin ® S2 (% by weight into the admixture) | Sorbitan ester ethoxylated type Montanox ® 80VG (% by weight into the admixture) | Stearic acid technical grade (% by weight into the admixture) | Triethanolamine (TEA) 85% technical grade (% by weight into the admixture) | Water (% by weight into admixture) | Stability at 20° C. | Pumpability |
| --- | --- | --- | --- | --- | --- | --- |
| 20 | 4 | | | Qsp 100% | − | −/+ |
| 20 | 8 | | | Qsp 100% | − | −/+ |
| 10 | 4 | | | Qsp 100% | − | −/+ |
| 10 | | 1.33 | 0.67 | Qsp 100% | + | − |
| 7.5 | | 0.05 | 0.025 | Qsp 100% | + (at least 12 months) | + |
| 5 | | 0.033 | 0.016 | Qsp 100% | −/+ | + |

Regarding the stability:
− means a stability less than 1 week,
−/+ means a stability less than to 1 month,
+ means a good stability, higher than 6 months.

Regarding the pumpability:
+ means easily pumpable,
−/+ means averagely pumpable,
− means hardly pumpable.

Example 4

Admixtures Based on Ethoxylated Stearyl Alcohol and Palmitic Acid/Lauric Acid and Morpholine/Triisopropanolamine Different formula of admixture based on ethoxylated stearyl alcohol have been produced. Thereby, palmitic acid or lauric acid have been used as fatty acid in combination with triisopropanolamine (TiPA; alkanolamine) or morpholine, respectively. The compositions, stabilities and pumpabilities (same classification as defined with table 3) are given in table 4 below. For all compositions, the remaining weight proportions (quantum satis to 100 wt.-%; "qsp") consist of water.

TABLE 4

| No. | Stearyl alcohol 2 ethoxylate (Eumulgin® S2) (% by weight into the admixture) | Palmitic acid (% by weight into the admixture) | Lauric acid (% by weight into the admixture) | Morpholin (% by weight into the admixture) | TiPA (% by weight into the admixture) | Stability at 20° C. | Pumpability |
|---|---|---|---|---|---|---|---|
| B | 7.5 | 0.05 |  | 0.025 |  | +/− | + |
| C | 7.5 |  | 0.05 | 0.025 |  | +/− | + |
| D | 7.5 |  | 0.05 |  | 0.025 | +/− | + |
| E | 7.5 | 0.05 |  |  | 0.025 | +/− | + |
| J | 7.5 | 1 |  | 0.5 |  | +/− | + |

Example 5

Admixtures Based on Ethoxylated Cetyl Alcohol and Palmitic Acid/Lauric Acid and Morpholine/Triisopropanolamine Different formula of admixture based on ethoxylated cetyl alcohol have been produced. Thereby, palmitic acid or lauric acid have been used as fatty acid in combination with triisopropanolamine (TiPA; alkanolamine) or morpholine, respectively. The compositions, stabilities and pumpabilities (same classification as defined with table 3) are given in table 5 below. For all compositions, the remaining weight proportions (quantum satis to 100 wt.-%; "qsp") consist of water.

TABLE 5

| No. | Cetyl alcohol 2 ethoxylate (Brij® 52) (% by weight into the admixture) | Palmitic acid (% by weight into the admixture) | Lauric acid (% by weight into the admixture) | Morpholine (% by weight into the admixture) | TiPA (% by weight into the admixture) | Stability at 20° C. | Pumpability |
|---|---|---|---|---|---|---|---|
| F | 7.5 | 0.05 |  | 0.025 |  | +/− | + |
| G | 7.5 |  | 0.05 | 0.025 |  | +/− | + |
| H | 7.5 |  | 0.05 |  | 0.025 | +/− | + |
| N | 7.5 | 1 |  | 0.5 |  | + | + |
| R | 7.5 | 1 |  |  | 0.5 | + | + |

Example 7

Preparation of Anhydrite Screeds with Admixtures B-R

Figure 4:
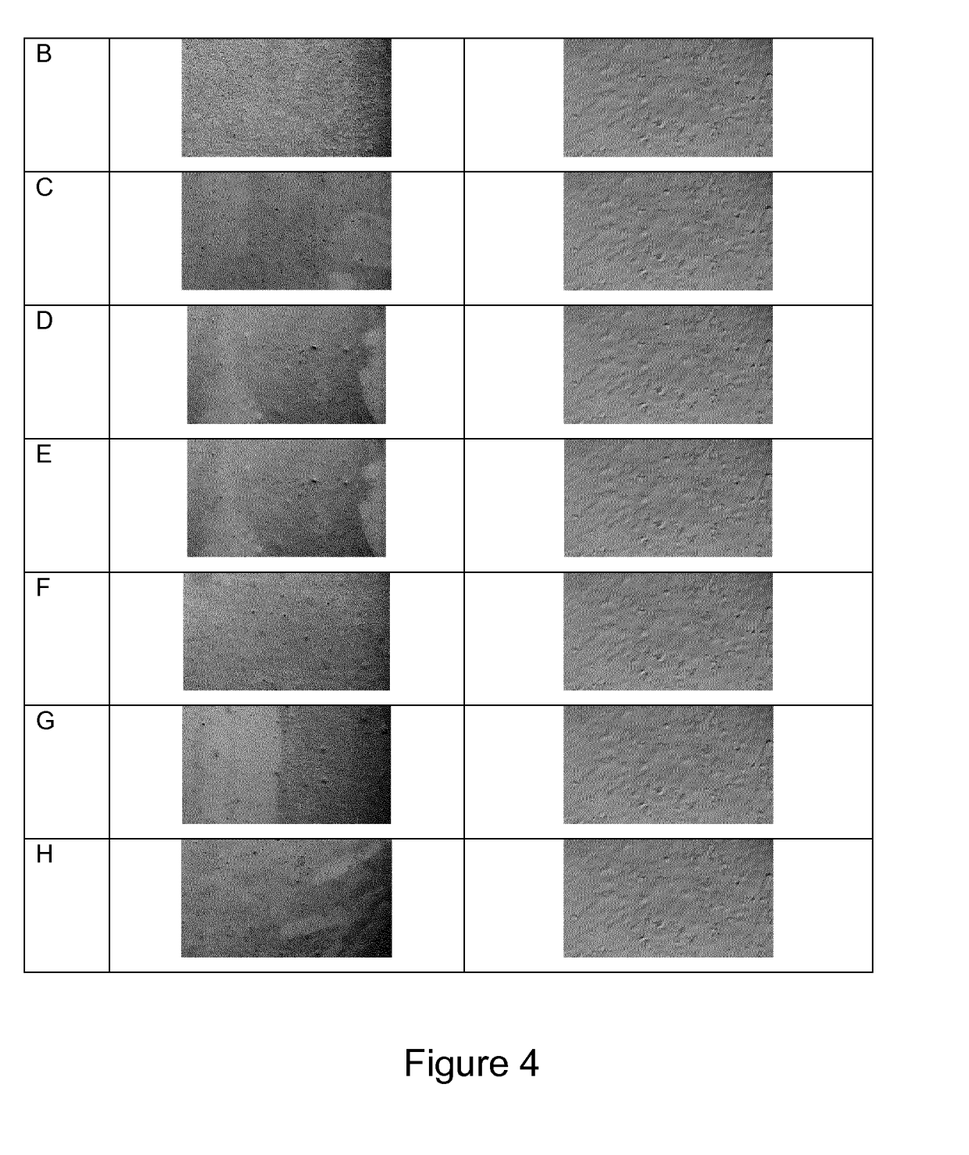
FIG. 4 shows pictures of classical screeds (without admixture according to the invention; right side) and screeds realized with various the admixtures B to H according to the invention (left side).
Figure 5:
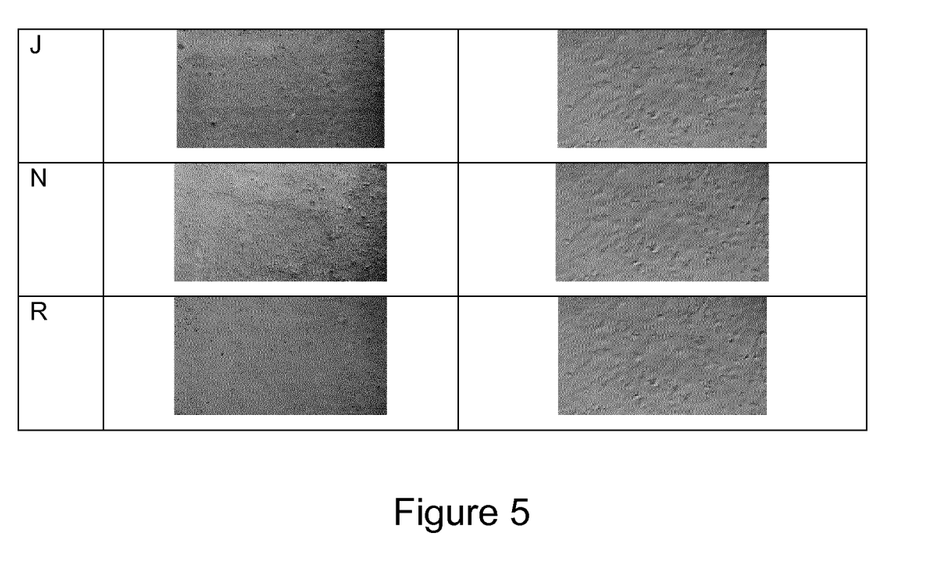
FIG. 5 shows pictures of classical screeds (without admixture according to the invention; right side) and screeds realized with various the admixtures J to R according to the invention (left side).

Different anhydrite screeds with and without anti-filming surface admixtures B to R have been produced in the same manner as described with example 2. FIGS. 4 and 5 show representative pictures of the screed surfaces obtained. On the left sides of FIGS. 4 and 5, the screed surfaces obtained with admixtures are shown whereas on the right sides the screed surfaces without admixtures are presented (for reasons of comparison).

As can be seen from FIGS. 4 and 5, all of the inventive admixtures clearly improve surface quality.

LIST OF REFERENCES

1. U.S. Pat. No. 6,849,118.
2. WO 2013124350.
3. WO 95/04008.
4. U.S. Pat. No. 3,486,916.
5. FR2948930.
6. FR2928915.
7. Weissermel et al. (2003). "Chap. 7. Oxidation Products of Ethylene". Industrial Organic Chemistry. Wiley-VCH. pp. 159-161.

The invention claimed is:

1. A composition consisting of:
    an ethoxylated fatty alcohol having from 8 to 22 carbon atoms and having an ethoxylation level of from 1 to 10 moles of ethylene oxide per mole of fatty alcohol, and an amount of the ethoxylated fatty alcohol being in a range of from 2% to 30% by weight,
    a trialkanolamine, or a morpholine or derivatives thereof, or a mixture containing one or more trialkanolamine(s) and/or morpholine and/or one or more derivative(s) of morpholine, and an amount of the trialkanolamine, or the morpholine or derivatives thereof, or the mixture being in a range of from 0.007% to 3% by weight,
    a fatty acid, and an amount of the fatty acid being in a range of from 0.013% to 6% by weight,
    an anti-foaming agent,
    a biocide, and
    optionally water, wherein when the water is present, the composition is an aqueous suspension.

2. The composition according to claim 1, wherein the trialkanolamine is triethanolamine.

3. The composition according to claim 1, wherein the fatty acid is stearic acid.

4. The composition according to claim 1, wherein water is present in a quantity sufficient for 100% by weight.

5. The composition according to claim 1, wherein the ethoxylated fatty alcohol has from 16 to 18 carbon atoms, and an ethoxylation level of 2 moles of ethylene oxide per mole of fatty alcohol.

6. A method comprising adding the composition according to claim 1 to a hydraulic binder.

7. The method according to claim 6, wherein the hydraulic binder comprises a calcium salt or Portland cement.

8. The method according to claim 7, wherein the calcium salt is a calcium sulfate in the form of a hemihydrate or an anhydrite.

9. A method comprising adding the composition according to claim 1 to a hydraulic binder in a sufficient amount to prevent formation of a surface film at a surface of the hydraulic binder.

10. A hydraulic binder, comprising the composition according to claim 1.

11. The hydraulic binder according to claim 10, comprising from 0.1 to 5% by weight of the composition.

12. A process for preventing formation of a surface film at a surface of hydraulic binders, comprising adding the composition according to claim 1 to a dry hydraulic binder.

13. The process according to claim 12, wherein composition is added to the dry hydraulic binder before mixing with any water.

14. A process for preparing the composition according to claim 1, comprising:
   a) melting the ethoxylated fatty alcohol and heating it at a temperature above its melting point,
   b) adding water to the melted ethoxylated fatty alcohol obtained from step a), and mixing,
   c) adding the fatty acid to the mixture obtained from step b), and mixing,
   d1) adding the trialkanolamine, or the morpholine or derivative thereof, or the mixture to the mixture obtained from step c), and mixing,
   d2) adding the anti-foaming agent to the mixture obtained from step d1), and mixing,
   e) adding water, and
   f) adding the biocide thereby obtaining the composition.

15. The composition according to claim 1, wherein the composition is in the form of a liquid or an aqueous dispersion.

16. The composition according to claim 1, wherein a density of the composition is from 0.7 to 1.0.

17. The composition according to claim 1, wherein the trialkanolamine comprises triisopropanolamine and/or triethanolamine, and/or morpholine is present.

18. The composition according to claim 1, wherein the trialkanolamine comprises triisopropanolamine, or morpholine is present.

19. The composition according to claim 1, wherein:
   the amount of the ethoxylated fatty alcohol is in a range of from 2% to 10% by weight,
   the amount of the trialkanolamine, or the morpholine or derivatives thereof, or the mixture is in a range of from 0.007% to 0.67% by weight, and
   the amount of the fatty acid is in a range of from 0.013% to 1.33% by weight by weight.

20. The composition according to claim 19, wherein the amount of the ethoxylated fatty alcohol is in a range of from 2% to 7.5% by weight.

* * * * *